United States Patent
Popp et al.

(10) Patent No.: US 8,101,284 B2
(45) Date of Patent: Jan. 24, 2012

(54) FIBRE METAL LAMINATE PANEL

(75) Inventors: Valentin Popp, Mill Creek, WA (US); Thomas Beumler, Jork (DE)

(73) Assignee: Airbus Operations GmbH, Hamburg (DE)

(*) Notice: Subject to any disclaimer, the term of this patent is extended or adjusted under 35 U.S.C. 154(b) by 131 days.

(21) Appl. No.: 12/574,141

(22) Filed: Oct. 6, 2009

(65) Prior Publication Data
US 2010/0086804 A1    Apr. 8, 2010

Related U.S. Application Data

(63) Continuation of application No. PCT/EP2008/054581, filed on Apr. 16, 2008.

(30) Foreign Application Priority Data

Apr. 26, 2007 (DE) .......... 10 2007 019 716

(51) Int. Cl.
*B64C 1/06* (2006.01)
*B64C 3/18* (2006.01)
*B32B 3/06* (2006.01)
*B32B 15/14* (2006.01)

(52) U.S. Cl. ......... 428/598; 428/608; 244/131; 244/132

(58) Field of Classification Search .......... None
See application file for complete search history.

(56) References Cited

U.S. PATENT DOCUMENTS

| | | | |
|---|---|---|---|
| 4,310,132 A * | 1/1982 | Frosch et al. | 244/119 |
| 5,429,326 A * | 7/1995 | Garesche et al. | 244/133 |
| 5,567,535 A | 10/1996 | Pettit et al. | |
| 6,736,919 B1 * | 5/2004 | Roebroeks | 156/201 |
| 2002/0000492 A1 | 1/2002 | Schmidt | |
| 2003/0168555 A1 * | 9/2003 | Livi et al. | 244/132 |
| 2004/0013826 A1 * | 1/2004 | Roebroeks | 428/33 |
| 2006/0159886 A1 * | 7/2006 | Rajabali et al. | 428/137 |
| 2007/0042214 A1 * | 2/2007 | Rajabali et al. | 428/624 |
| 2008/0006741 A1 * | 1/2008 | Martin et al. | 244/119 |

FOREIGN PATENT DOCUMENTS

| | | |
|---|---|---|
| DE | 69314175 T2 | 12/1998 |
| DE | 69808903 T2 | 7/2003 |
| WO | WO94/01277 A | 1/1994 |
| WO | WO98/53989 A | 12/1998 |
| WO | WO02/094565 A | 11/2002 |
| WO | WO2005/032805 A | 4/2005 |
| WO | WO2008/132050 A | 11/2008 |

OTHER PUBLICATIONS

German Office Action for DE 10 2007 019 716.2 dated Sep. 20, 2007.
International Search Report for PCT/EP2008/054581 dated Oct. 7, 2008.

* cited by examiner

*Primary Examiner* — John J Zimmerman
(74) *Attorney, Agent, or Firm* — Jenkins, Wilson, Taylor & Hunt, P.A.

(57) ABSTRACT

A fiber metal laminate panel with a number of layers, arranged in the form of a laminate, of a planar metal material and a fiber material, the planar metal material being joined at splices by a metal-metal connection to overlapping metal layers, and, in reinforced regions which are used to attach the panel to a support structure with longitudinally extending support elements, additional layers of at least the planar metal material being provided. The additional metal layers reinforcing the panel are formed by overlapping metal-metal connections of the splices.

2 Claims, 6 Drawing Sheets

Fibre layers 102 not shown

Section A-A

Prior Art

Fibre layers 102 not shown

Fibre layers 102 not shown

FIBRE METAL LAMINATE PANEL

CROSS REFERENCE TO RELATED APPLICATIONS

This application is a continuation of PCT International Application No. PCT/EP2008/054581 filed Apr. 16, 2008, which claims the benefit of German patent application No. 10 2007 019 716.2, filed Apr. 26, 2007, the entire disclosure of which is herein incorporated by reference.

FIELD OF THE INVENTION

The invention relates to a fibre metal laminate panel with a number of layers, arranged in the form of a laminate, of a planar metal material and a fibre material, the planar metal material being joined at splices by a metal-metal connection to overlapping metal layers, and, in reinforced regions used to attach the panel to a support structure with longitudinally extending support elements, additional layers, at least of the planar metal material, being provided.

SUMMARY OF THE INVENTION

The object of the invention is to develop a fibre metal laminate panel of the aforementioned type in such a way that it is light yet strong and easy to produce.

The object is achieved by a fibre metal laminate panel with features as described herein. Embodiments and developments of the fibre metal laminate panel according to the invention are provided herein.

The invention provides a fibre metal laminate panel with a number of layers, arranged in the form of a laminate, of a planar metal material and a fibre material, the planar metal material being joined at splices by a metal-metal connection to overlapping metal layers, and, in reinforced regions used to attach the panel to a support structure with longitudinally extended support elements, additional layers, at least of the planar metal material, being provided. According to the invention, it is provided for the additional metal layers reinforcing the panel to be formed by overlapping metal-metal connections of the splices.

The laminate may contain a plurality of metal layers with respective splices, of which one or more are provided in a reinforcing region.

A plurality of splices provided in a reinforcing region may therefore be arranged on top of one another in such a way that they form a standard reinforcing region.

A plurality of splices provided in a reinforcing region may also be arranged so as to be laterally offset from one another in such a way that they form a standard reinforcing region.

Both metal layers with splices formed by overlapping metal-metal connections and continuous metal layers are provided at a reinforcing region.

The panel may comprise a plurality of reinforcing regions which, in a first direction, are longitudinally extended and, in a second direction extending transversely to the first direction, are set apart from one another by a distance which is only a fraction of the extension of the planar metal material in this direction, the splices of different metal layers being remotely offset from one another in the second direction in at least one reinforcing region.

The metal layers may be formed by a sheet material which, in its longitudinal direction, extends substantially parallel to the direction of the longitudinally extended reinforcing regions formed by the splices.

The laminate of the panel may contain first metal layers, of which the sheets extend in the first direction and are connected to one another at splices which form first reinforcing regions extending in the first direction and are transversely set apart therefrom in the second direction and, furthermore, may contain second metal layers, of which the sheets extend in the second direction and are connected to one another at splices which form second reinforcing regions extending in the second direction and are transversely set apart therefrom in the first direction.

In addition to the layers formed by the splices, reinforcements may also be provided by further layers of the metal material and/or the fibre material.

The further layers may therefore be provided between intersecting reinforcing regions extending in different directions in order to level the height.

The panel may be part of an outer skin of an aircraft body, the reinforcing regions being arranged on first support elements extending in a first direction and/or on second support elements extending in a second direction of a support structure of the aircraft body.

The panel may also be part of the sheeting of a wing or a tail unit of an aircraft, the reinforcing regions being arranged on first support elements extending in a first direction and/or on second support elements extending in a second direction of the wing or of the tail unit.

BRIEF DESCRIPTION OF THE DRAWINGS

Embodiments of the fibre metal laminate panel according to the invention will be explained hereinafter with reference to the drawings, in which.

DETAILED DESCRIPTION OF THE DRAWINGS

Figure 1:
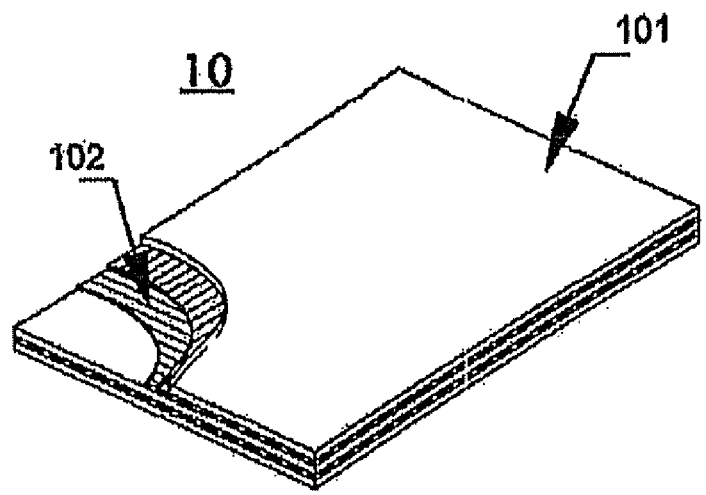
FIG. 1 is a perspective, partly cut-away view of a fibre metal laminate panel, showing the individual layers of the panel.

The fibre metal laminate panel shown in FIG. 1 consists of a plurality of layers, arranged on top of one another, of a planar metal material 101 and a fibre material 102. The fibre material 102 may be a conventional textile fibre material, fabric or scrim, which is known per se, with glass fibres, aramid fibres, carbon fibres or similar suitable fibres. The fibre material 102 forms a matrix for a resin, by means of which the layers of the planar metal material 101 are connected. The planar metal material 101 may be a known metal material in the form of a thin sheet metal or a metal foil, or an aluminium, titanium or other suitable metal alloy.

Figure 2:
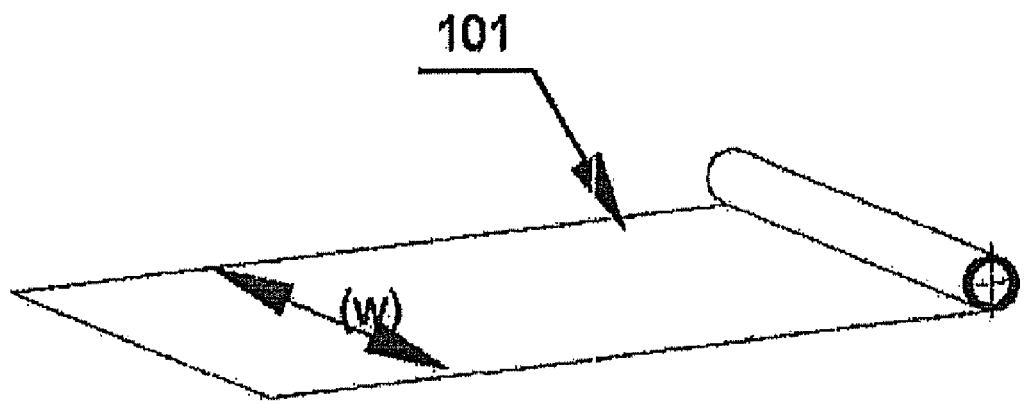
FIG. 2 is a schematic, perspective view of a planar metal material provided in the form of a sheet, in which form it can be used to produce metal layers of the fibre metal laminate panel according to the invention.
Figure 3:
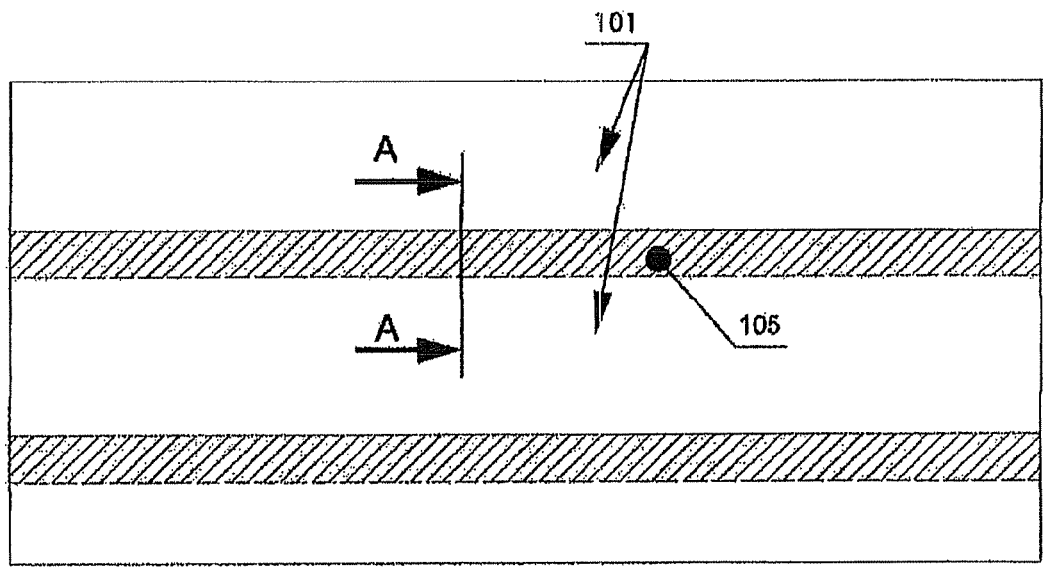
FIG. 3 is a plan view of a fibre metal laminate panel according to an embodiment of the invention, splices being represented by hatching, at which individual sheets of the metal material can be joined by a metal-metal connection to overlapping metal layers.
Figure 4:
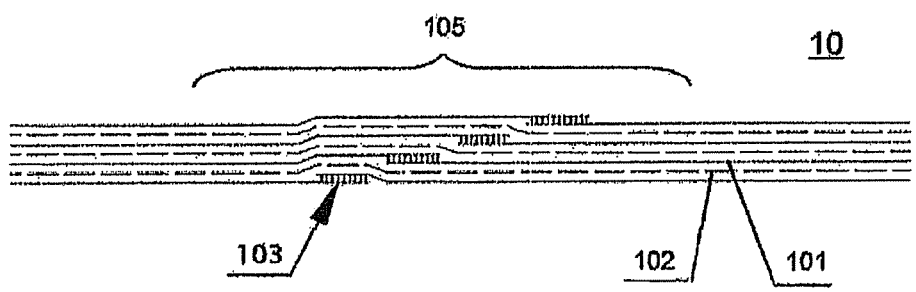
FIG. 4 is a cross-sectional view along the line A-A in FIG. 3, which shows a section through one of the splices.

The planar metal material forming the metal layers 101 is normally available in the form of a sheet material in the form of a roll, as shown in FIG. 2. Typically, the size (in FIG. 2 the width w) of this raw material used for the metal layers 101 is smaller than that of the final panel 10, as is shown in FIG. 3. This means that the planar metal material 101 must be joined at splices 105 by metal-metal connections 103 to overlapping metal layers 101. The splices 105 are shown in FIG. 3 as hatching in the plan view and in FIG. 4 they are shown in an enlarged cross-sectional view. The metal layers 101 are shown in FIG. 4 by lines which have been crossed through, and the layers of the fibre material 102 are shown by dashed lines. The layers 102 of the fibre material are presumed to be continuous since they are conventionally available as a sheet material with a sufficiently large width or can easily be butt-joined together. The production of larger laminate panels 10 with overlapping metal-metal connections 103 where the planar metal material is joined by a metal-metal connection to overlapping metal layers, as shown in FIGS. 3 and 4, is conventionally referred to as "splicing".

Figure 5:
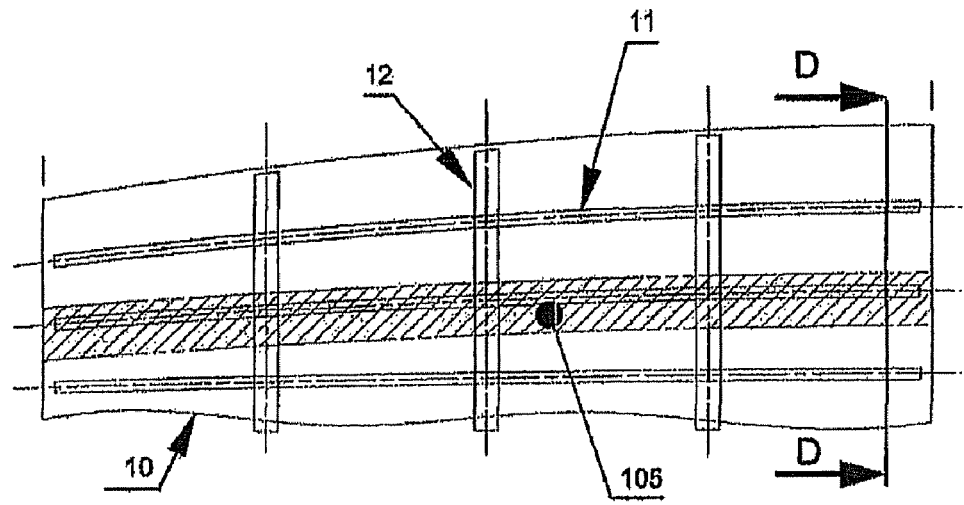
FIGS. 5 and 6 are respective plan views of a fibre metal laminate panel, which is arranged on a support structure of an aircraft body which is formed by first support elements (stringers) extending in the longitudinal direction and second support elements (formers) extending in the lateral direction.

If fibre metal laminate panels of this type are used to produce an outer skin of an aircraft, for example for an aircraft body, they are applied on a system of a support structure which comprises (longitudinal) first support elements 11 extending in the longitudinal direction, for example stringers, and (transverse) second support elements 12 extending transversely thereto, for example formers. It is therefore assumed that the splices or the splice region 105 extends in the same direction as the longitudinal direction, as shown in FIG. 5. The panels are attached to the support structure by gluing, by mans of fixing elements or, in most cases, by a combination of these two measures.

In order to improve the transfer of the loads between the panel 10 and the support structure 11, 12, the regions of the panel 10 which abut the support structure 11, 12 are reinforced in a suitable manner. This is normally achieved by additional layers of the planar metal material 101, and optionally also of the fibre material 102, the thickness of the panel 10 thus being increased at said reinforcing regions.

Figure 6:
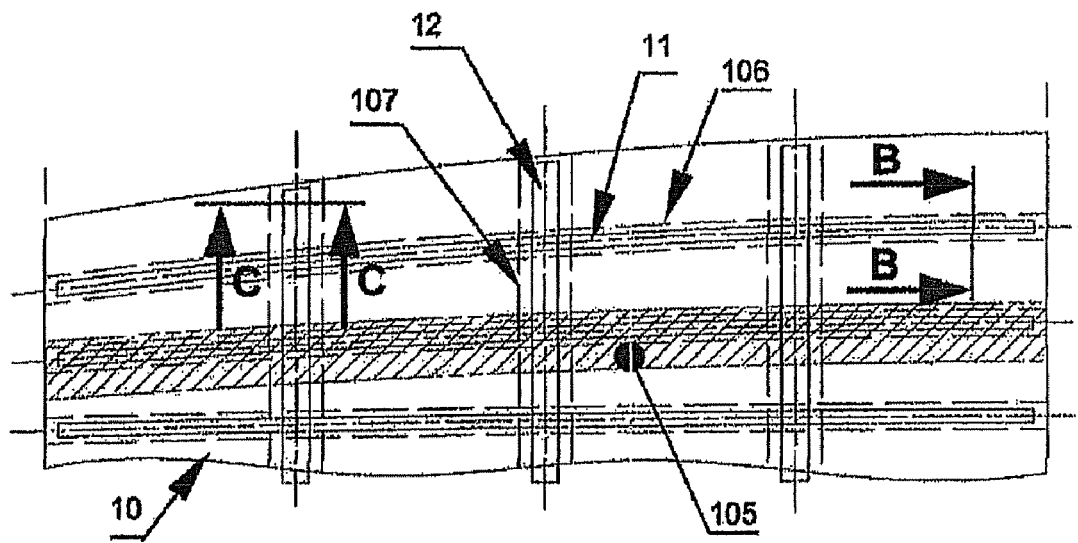
Figure 7:
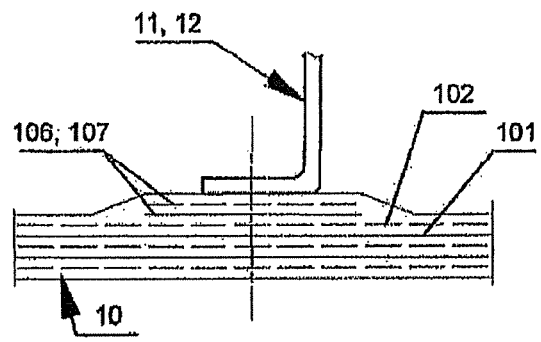
FIG. 7 is an enlarged, cross-sectional view along the line B-B or C-C of FIG. 6 which shows a reinforcing region, at which the panel is fixed to first support elements (stringers) extending in the longitudinal direction or second support elements (formers) extending in the lateral direction of the support structure of the aircraft body and which, according to the prior art, is formed by additional material layers in the laminate.

In FIG. 6, reinforcing regions 106, 107 of this type are shown, which extend along the longitudinal elements 11 and along the transverse elements 12 of the support structure. The layers attached for reinforcement could be provided so as to be intralaminar, i.e. inside the laminate, or by being glued onto the surface of the laminate. FIG. 7 shows, in an enlarged cross-sectional view, a reinforcing region 106, 107 which is formed by both a metal layer and a fibre layer in the outer region of the laminate, which are then covered by a sealing outer metal layer 101.

Figure 8:
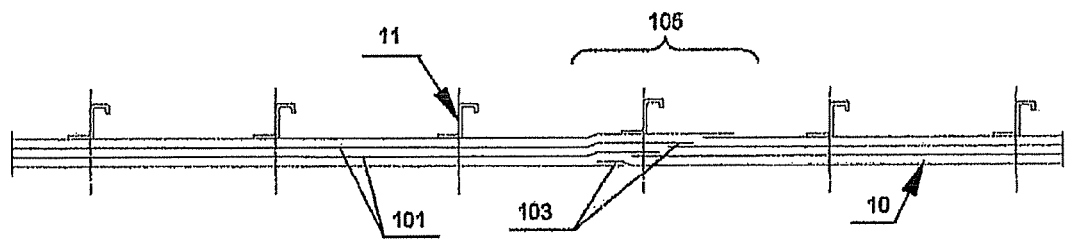
FIG. 8 is a cross-sectional view D-D from FIG. 5 through a fibre metal laminate panel according to an embodiment of the invention.
Figure 9:
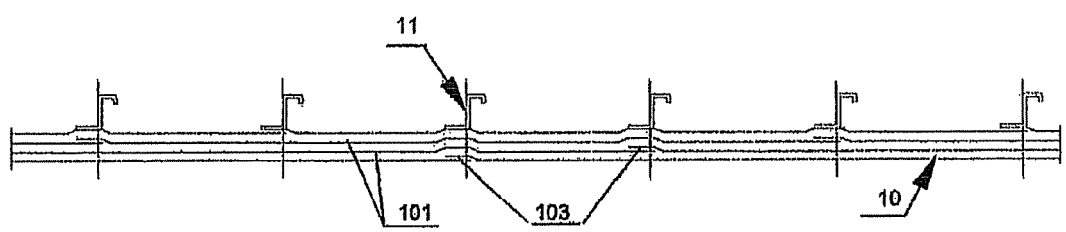
FIG. 9 is a cross-sectional view E-E from FIG. 13 through a fibre metal laminate panel according to a further embodiment of the invention.
Figure 10:
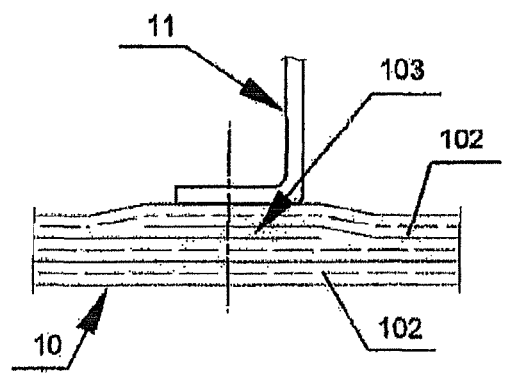
FIG. 10 is an enlarged, cross-sectional view of a reinforcing region, at which the panel is attached to an element of the support structure of the aircraft body and which is formed by metal layers of a splice of the planar metal material, where the planar metal material is joined by a metal-metal connection to overlapping metal layers, according to an embodiment of the invention.
Figure 11:
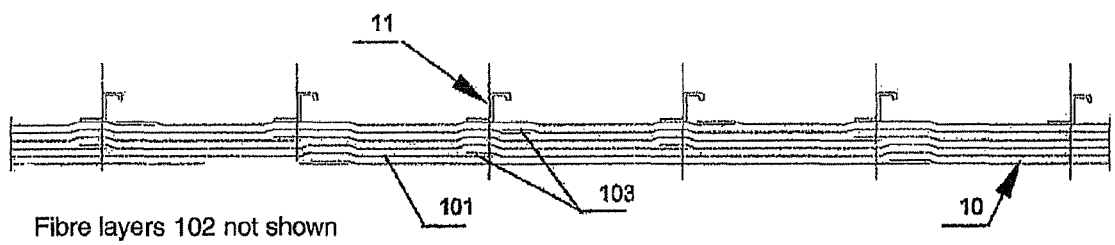
FIG. 11 is a cross-sectional view through a fibre metal laminate panel according to a further embodiment of the invention.

Returning to the description of the embodiments, reference is now made to FIG. 8 to 12. FIGS. 8, 9 and 11 show respective fibre metal laminate panels 10 in cross-section, in which the reinforced regions or reinforcing regions 106, 107, at which the panel 10 is attached to the support structure 11, 12, are formed by overlapping metal-metal connections 103 of splices 105. This means that the additional metal layers 101 reinforcing the panel 10 are formed by a metal-metal connection 103 to overlapping metal layers 101, to which the planar metal material of the metal sheets 101 is joined in order to be able to produce a panel 10 which is larger than the planar metal material in this direction.

In the embodiment shown in FIG. 8, the laminate 10 contains a plurality of metal layers 101 with splices 105 which form a reinforcing region 106, 107 and are arranged so as to be laterally offset from one another in such a way that their width forms a standard reinforcing region 106, 107. In the embodiment shown in FIG. 9, both metal layers 101 with splices 105 formed by overlapping metal-metal connections and continuous metal layers 101 are provided at a reinforcing region 106, 107. The panel therefore has a plurality of reinforcing regions 106, 107 that are set apart from one another in the direction transverse to the extension of the splices 105, i.e. in the direction transverse to the longitudinal extension thereof, by a distance which is (only) a fraction of the extension of the planar metal material 101 in said direction. The splices 105 of the different metal layers 101 are offset from one another in this direction by at least the distance between the reinforcing regions 106, 107 and in the embodiments shown by four such distances.

FIG. 10 shows in an enlarged cross-sectional view a reinforcing region 106, 107, at which the planar metal material is joined by a splice 105 to overlapping metal layers 101. By enlarging the thickness of the laminate, a reinforced region is thus formed here, at which an element, in this case a longitudinal element 11, of the support structure, is arranged.

Figure 12:
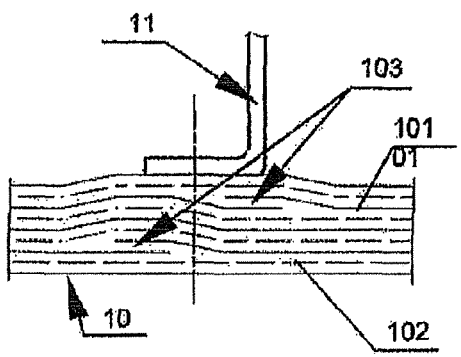
FIG. 12 is an enlarged, cross-sectional view of a reinforcing region, where the planar metal material is joined at splices by a metal-metal connection to overlapping metal layers and where the fibre metal laminate panel is fixed to an element of a support structure of an aircraft body.
Figure 13:
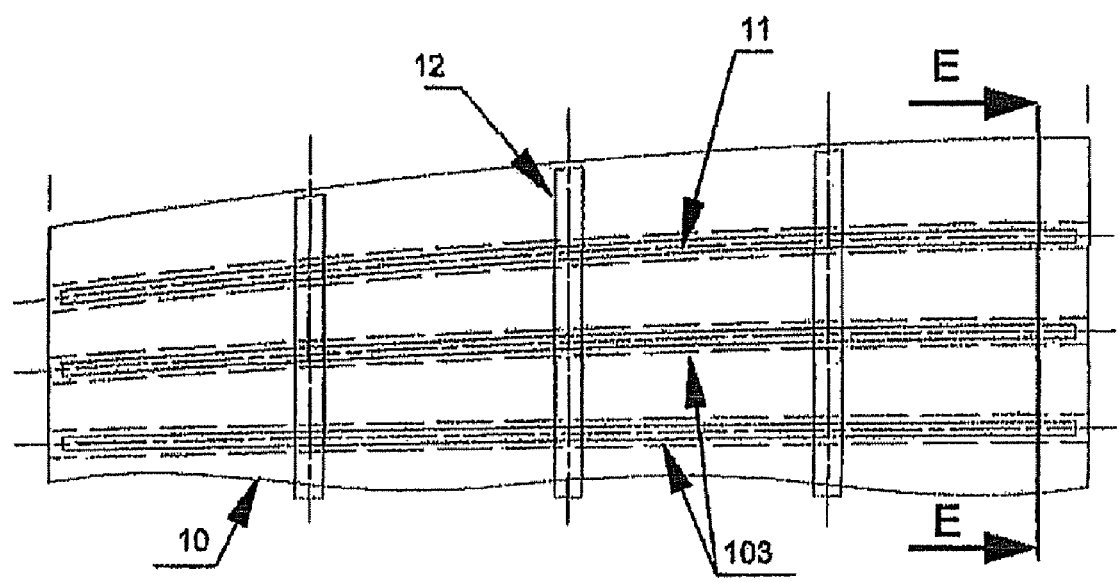
FIG. 13 is a plan view of a fibre metal laminate panel, which is arranged on a support structure of an aircraft body which is formed by first support elements (stringers) extending in the longitudinal direction and second support elements (formers) extending in the lateral direction.

In the embodiment shown in FIGS. 11 and 12, a plurality of splices 105 are arranged so as to be laterally offset from one another in such a way that their width and height form a standard reinforcing region 106, 107.

According to further embodiments, the laminate of the panel 10 may contain first metal layers 101, the sheets of which extend in a first direction and are connected to one another at splices 105 which form first reinforcing regions 106 extending in the first direction and are set apart in a second direction transverse thereto, and also second metal layers 101, of which the sheets extend in the second direction transverse to the sheets of the first layers and are connected to one another at splices 105 which form second reinforcing regions 107 extending in the second direction and set apart in the first direction transverse thereto.

In addition to the metal layers 101 formed by the splices 105, reinforcements may be provided by further layers of the metal material 101 and/or of the fibre material 102, which may be provided in the form of intralaminar layers inside the laminate or glued onto the surface thereof. In order to level the height, said further layers may also be provided only between intersecting reinforcing regions 106, 107 extending in different directions, in such a way that a standard height for the reinforcing regions 106, 107 results, both at the intersections and between them.

The fibre metal laminate described advantageously combines a low weight with simultaneous strength and low development and production costs, and can be produced more quickly than previously.

LIST OF REFERENCE NUMERALS

10 panel
11 first support element
12 second support element
101 metal layer
102 fibre material layer
103 metal-metal connection
105 splice, splice region
106 reinforcing region
107 reinforcing region

What is claimed is:

1. An aircraft comprising:
   a fibre metal laminate panel having a number of layers, arranged in the form of a laminate, of a planar metal material and a fibre material, the planar metal material being joined at splices by a metal-metal connection by overlapping metal layers, the splices being offset laterally and in a direction normal to a plane of a respective metal layer from one another, and
   a plurality of stringers or formers, each stringer or former extending along a respective splice,
   wherein the panel is attached in the region of each splice to a respective stringer or former.

2. The aircraft according to claim 1, wherein a further splice of a further layer is provided adjacent to each of the splices which are laterally offset from one another.

* * * * *